(12) United States Patent
Hanke et al.

(10) Patent No.: US 7,806,347 B2
(45) Date of Patent: Oct. 5, 2010

(54) WATER PUMP AND FOUNTAIN WITH PUMP

(75) Inventors: Andreas Hanke, Osnabrück (DE); Herbert Lambers, Hörstel (DE)

(73) Assignee: OASE GmbH, Hörstel-Riesenbeck (DE)

( * ) Notice: Subject to any disclaimer, the term of this patent is extended or adjusted under 35 U.S.C. 154(b) by 76 days.

(21) Appl. No.: 11/848,675

(22) Filed: Aug. 31, 2007

(65) Prior Publication Data

US 2008/0054088 A1    Mar. 6, 2008

(51) Int. Cl.
| | |
|---|---|
| *F21S 8/00* | (2006.01) |
| *E03B 9/20* | (2006.01) |
| *A01G 27/00* | (2006.01) |
| *F04B 49/00* | (2006.01) |

(52) U.S. Cl. .............. 239/20; 239/16; 239/17; 239/69; 417/2; 417/42; 417/44.1

(58) Field of Classification Search .................. 239/16, 239/17, 18, 19, 22, 23, 20, 67, 66, 69, 70; 417/2, 42, 44.1
See application file for complete search history.

(56) References Cited

U.S. PATENT DOCUMENTS

| | | | |
|---|---|---|---|
| 5,152,210 A * | 10/1992 | Chen .................. 84/464 R |
| 5,510,022 A * | 4/1996 | Mullis .................. 210/170.06 |
| 6,206,298 B1 * | 3/2001 | Ting .......................... 239/20 |
| 6,271,638 B1 * | 8/2001 | Erdman et al. ......... 318/400.01 |
| 6,276,612 B1 * | 8/2001 | Hall ........................... 239/17 |
| 6,375,090 B1 * | 4/2002 | Beidokhti .................. 239/17 |
| 6,427,927 B1 * | 8/2002 | Hall ........................... 239/17 |
| 6,805,299 B1 * | 10/2004 | Wasmer et al. ............. 239/17 |
| 7,245,103 B2 * | 7/2007 | Chapman et al. ........... 318/651 |
| 7,427,036 B2 * | 9/2008 | Skluzacek et al. ........... 239/18 |
| 2005/0156068 A1 * | 7/2005 | Ivans ......................... 239/723 |
| 2008/0245887 A1 * | 10/2008 | Cox ........................... 239/16 |

\* cited by examiner

*Primary Examiner*—Len Tran
*Assistant Examiner*—Justin Jonaitis
(74) *Attorney, Agent, or Firm*—Gudrun E. Huckett

(57) ABSTRACT

A water pump with a housing that has a pump housing part provided with an intake opening and an outlet opening and a motor housing part. An impeller with a shaft is rotatably arranged in the pump housing part. An electric motor is received in the motor housing part. The electric motor is an electronically commutated motor with a rotor and coils. In the housing, control and governing electronics for the electric motor are arranged that have a speed detection, a processor, and a data storage device. The electronics are arranged in the motor housing part and potted therein in a water-tight way. An integrated BUS control module is provided. The control electronics and the governing electronics can be arranged separate from one another on different circuit boards.

8 Claims, 2 Drawing Sheets

WATER PUMP AND FOUNTAIN WITH PUMP

BACKGROUND OF THE INVENTION

The invention concerns a water pump, in particular for fountains or water display devices as well as garden ponds, comprising a housing with a pump housing part provided with an intake opening and an outlet opening, in which housing part an impeller with a shaft is arranged rotatably, and further comprising a motor housing part, in which an electric motor is received. The invention also relates to well as a water display device or fountain with a water pump and with several water jets.

Conventional water pumps for garden ponds and fountains are in practice externally controlled when the type and height of the water jet or generally start and stop of the pump are to be controlled. In order to achieve in fountains, primarily in multi-jet fountains, special water effects, in conventional pumps the control of the water quantity for each water outlet is realized by electric control valves. In this connection, a single large pump supplies the water into a distribution system in which individual control valves correlated with the downstream water jets are activated by an external control. These systems react very slowly and can be controlled only imprecisely. Moreover, the electric control valves represent a high cost factor. Also, the complex wiring, piping and control cause high system costs. Moreover, the running costs are high because the pump must always operate under full load. Alternatively, asynchronous pumps can be considered that are controlled by means of phase angle control. These controls are however expensive, have a slow response, and are difficult to control.

SUMMARY OF THE INVENTION

The invention concerns therefore the problem to provide a solution in this connection.

The solution to the object resides in a water pump of the aforementioned kind having an electric motor that is an electronically commutated motor with rotor and coils and further having control and governing electronics for the motor arranged in the housing, which electronics comprise a speed detection, a processor, and a data storage device. The water display device of the invention is characterized in that it comprises several water pumps of the present invention that are connected to a common control device.

By combining the use of an electronically commutated motor (EC motor), control electronics and governing electronics with engine speed detection, processor, and data storage device, the pump is configured as an autonomous unit. The entire intelligence that is required for a precise control resides in the pump itself. The processor-supported and software-supported control enables that a desired speed of the pump is actually achieved and maintained so that a closed-loop control circuit is present in which the speed can be continuously detected, compensated, and possibly adjusted.

The speed detection device can have a speed sensor that is designed for recognizing the rotor position and the rotary frequency of the motor (path a) in FIG. 1). This sensor can be, for example, a Hall sensor. It is also possible, and realizable without additional material expenditure by means of the intelligence inherent in the pump, to configure the speed detection device without a sensor (path b) of FIG. 1). In this connection, at any point in time at the coil or coils momentarily not supplied with current and not switched at the moment, the current flow induced by the magnet rotor is measured and, based thereon, the rotor position is determined. In this connection, the speed at which the coils that generate an induced current flow change provides the rotary frequency. Both pieces of information are evaluated by means of the processor and utilized for speed control.

The data storage device of the pump according to the invention can preferably have several programs for different types of pump operation which can be activated without opening the pump from the exterior as needed. For example, when using the pump in garden ponds it is thus possible, by means of an external operating unit, to call up programs tailored by the operator, for example, summer or winter operating programs, programs for many or few fishes in the pond, time-of-day dependent temporal profiles or the like.

BRIEF DESCRIPTION OF THE DRAWINGS

Further advantages and details result from the dependent claims and the embodiments of the invention illustrated in the drawings and to be explained in the following. It is shown in:

DESCRIPTION OF PREFERRED EMBODIMENTS

Figure 1:
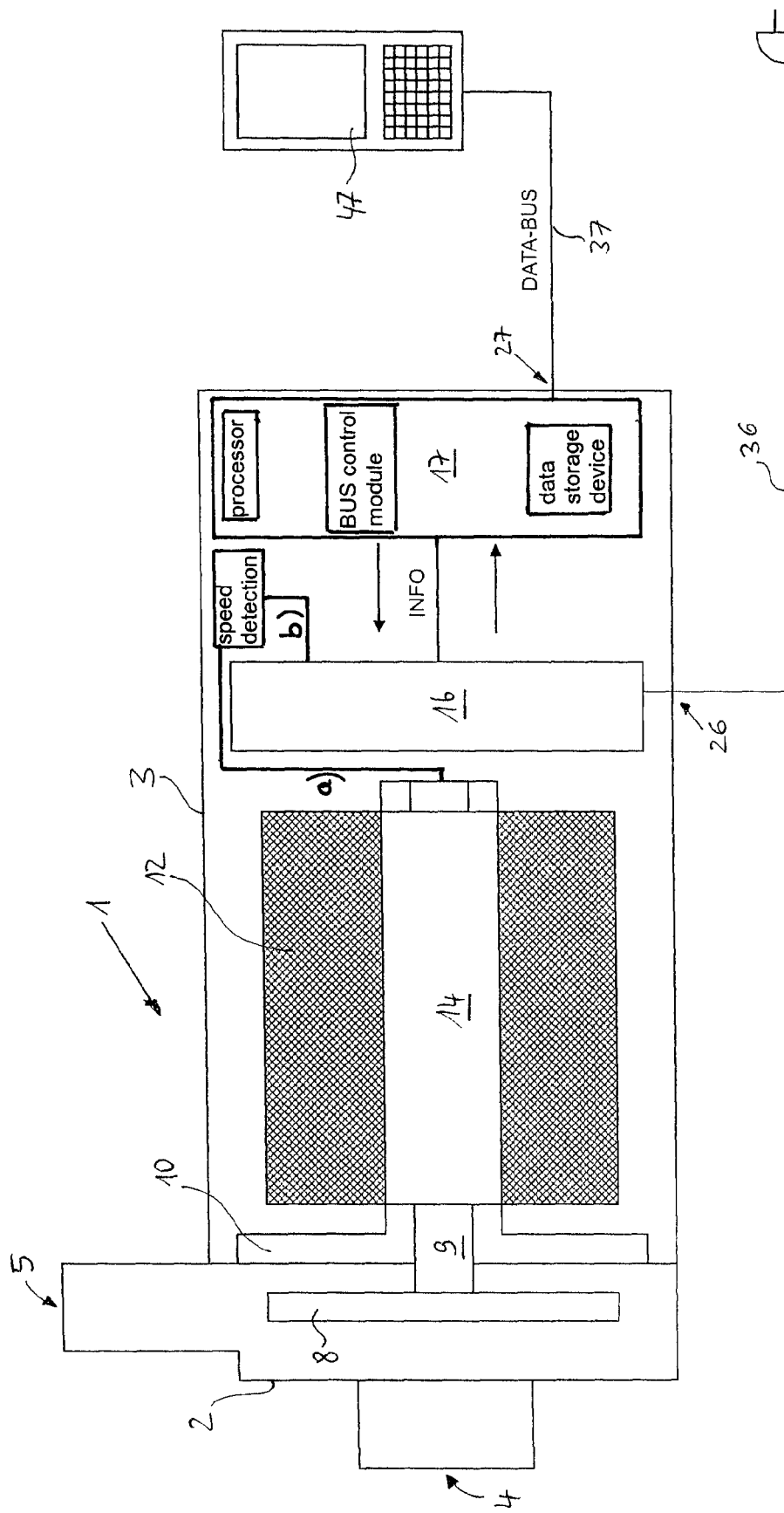
FIG. 1 schematically a pump according to the invention.

The water pump illustrated in FIG. 1 has a housing 1 which is subdivided into a pump housing part 2 and a motor housing part 3. The pump housing part 2 has an intake opening 4 providing the water intake and an outlet opening 5 serving as a water outlet. In the pump housing part 2 an impeller 8 is arranged on a rotatable shaft 9. The shaft 9 extends from the pump housing 2 into the motor housing part 3 and into the EC motor provided therein. The EC motor has a rotor 14 fixedly connected to shaft 9 and a stator 12 surrounding it. Preferably, the rotor 14 is of a two-pole configuration and the stator 12 is of a six-pole configuration (or of a two-pole configuration with protective extra-low voltage). This enhances in an optimal cost/benefit ratio the control and governing dynamics of the pump to be described in the following. The shaft 9 is supported in an end shield 10 that shields the motor mechanically relative to the pump housing part 2 and the impeller 8.

Control and governing electronics are also provided in the housing 1 and preferably arranged also in the motor housing part 3 and thus spaced from the water-conveying parts. The control and governing electronics can be potted water-tightly for safety reasons. This holds true also for the stator 12 of the motor. Inasmuch as stator 12 and rotor 14 are separated from one another by a so-called split cage, preferably the entire free motor housing part can be potted in a water-tight way.

In the embodiment illustrated in FIG. 1 the entire power electronics 16 that also comprises the pure control electronics of the pump is arranged on a first circuit board that is proximal to the motor. Arranged on a circuit board 17 that is positioned behind the first circuit board are the governing electronics with microprocessor and data storage device as well as, in the illustrated embodiment, a BUS control module that receives data BUS signals sent from outside the pump to the pump and converts these data to activity of the pump. Between the two circuit boards 16 and 17 mutual information exchange takes place within the pump. The pump is provided with an electric power input 26 and a control line input 27 that is independent from the input 26 and through which the control information is supplied. An electric cable 36 beginning at the electric power input 26 exits from the pump housing 1 while a control data cable 37 connects a control panel 47 to the control input 27. Of course, the two cables 36, 37 can extend within a common casing; however, preferably they are separate from one another in a visually recognizable way so that wrong connections are prevented.

Figure 2:
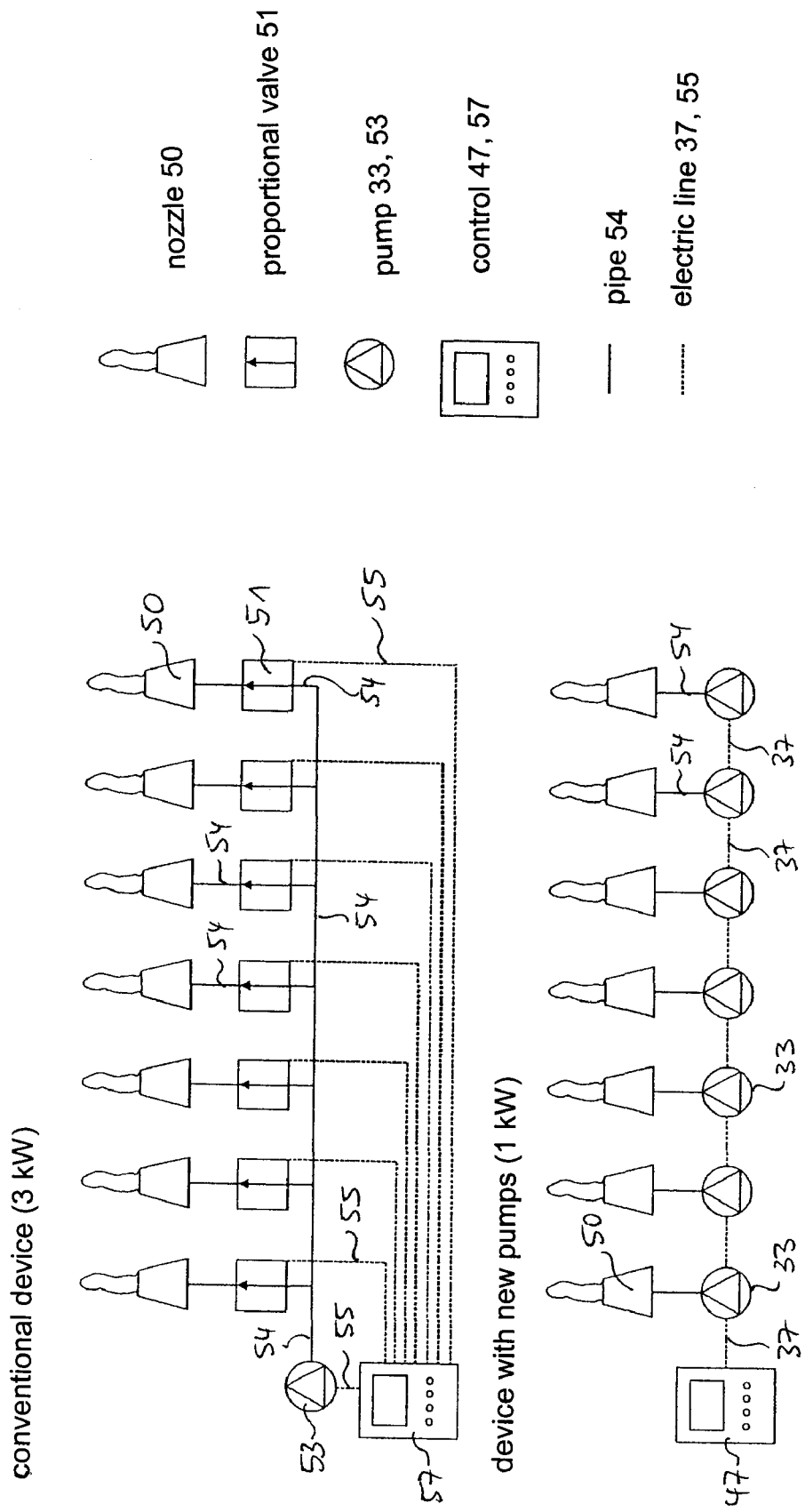
FIG. 2 schematically the configuration of a waterdisplay device of the conventional type (top left side of the drawing) and, in contrast to this, one using the new pumps according to the invention (bottom left side of the drawing).

In FIG. 2, the upper left area shows a water display device or fountain device of the conventional type. Several jets or nozzles 50 are controlled by means of their own proportional valve 51 and their own electric lines 55, respectively. For this purpose, the electric lines 55 are connected to an external control unit 57. A central pump 53 is also connected to the external control unit 57 and is connected through pipes 54 to the proportional valves 51 and is always running under full load. The proportional valves 51, controlled by the control 57, release or interrupt water flow to the jets 50.

Underneath a new water display device or fountain device is illustrated that has several pumps 33 according to the invention. They are connected to a common control device in the form of control panel 47. The device has the same number of jets 50 as the conventional device. In contrast to the upper device, in the device according to the invention however each nozzle 50 has correlated therewith its own pump 33. The pumps are connected by control cables 37 to the control panel 47. Even though other control systems are possible, in this connection particularly a standardized BUS system with digital signal transmission is especially preferred. As illustrated, the pumps 33 can be connected to the control panel 47 by means of electric or electronic serial connection.

While in the conventional system a complex control 57 from the exterior is required, in the new system the complete intelligence is residing in the pumps 33, respectively. Wiring expenditure is reduced to a minimum and complex piping is not needed at all. Moreover, pumps with EC motors can be produced inexpensively and have a high efficiency that reduces the running costs. The energy consumption for the novel device is proportional approximately to the speed that is demanded, in accordance with the water flow rate. For example, the conventional device illustrated at the top would have a power input three times as high as a comparable novel device, e.g., 3 kW compared to 1 kW.

The pumps 33 according to the invention have excellent control and governing dynamics enabling a precise control of the pump 33 and thus unexpected effects. The control behavior in the lower range is as precise as in the upper range. This control behavior cannot be achieved with conventional technology.

The specification incorporates by reference the entire disclosure of German priority application 10 2006 041 310.5 having a filing date of Sep. 1, 2006.

While specific embodiments of the invention have been shown and described in detail to illustrate the inventive principles, it will be understood that the invention may be embodied otherwise without departing from such principles.

What is claimed is:

1. A water display device comprising:
several water jets each provided with a water pump, respectively;
wherein the water pumps each comprise:
a housing separated into a pump housing part and a motor housing part, wherein the pump housing part is provided with an intake opening and an outlet opening so that water passes only through the pump housing part;
an impeller with a shaft arranged rotatably in the pump housing part;
an electric motor arranged in the motor housing part wherein the electric motor is an electronically commutated motor with a rotor and coils and is drivingly connected to the shaft;
control and governing electronics for the electric motor arranged in the motor housing part and comprising a speed detection, a processor, and a data storage device;
a common control device;
a bus system connecting the water pumps serially to one another and connecting the serially connected water pumps to the common control device.

2. The water display device according to claim 1, wherein the control and governing electronics are potted water-tightly in the motor housing part.

3. The water display device according to claim 1, wherein the control and governing electronics comprise control electronics and governing electronics that are spatially separated from one another and arranged on separate circuit boards.

4. The water display device according to claim 1, wherein the water pumps each comprise an integrated BUS control module interacting with the BUS system.

5. The water display device according to claim 1, wherein the water pumps each comprise an electric power input and a separate control line input.

6. The water display device according to claim 1, wherein the speed detection comprises a speed sensor for detecting a rotor position of the rotor and a rotary frequency of the electric motor.

7. The water display device according to claim 1, wherein the speed detection is configured without sensor and measures an induced current flow on the coils that momentarily are not supplied with current, respectively.

8. The water display device according to claim 1, wherein the data storage device comprises different programs for different types of pump operation which programs are called up from the exterior.

* * * * *